United States Patent [19]

Gudmestad

[11] 4,317,391

[45] Mar. 2, 1982

[54] QUICK CHANGE WIRE CUTTING AND STRIPPING BLADE TOOL HOLDER

[75] Inventor: Ragnar Gudmestad, West Allis, Wis.

[73] Assignee: Artos Engineering Company, New Berlin, Wis.

[21] Appl. No.: 178,166

[22] Filed: Aug. 14, 1980

[51] Int. Cl.³ .............................................. H02B 1/12
[52] U.S. Cl. ............................................... 81/9.51
[58] Field of Search ........................... 81/9.5 R, 9.51

[56] References Cited

U.S. PATENT DOCUMENTS

| | | | |
|---|---|---|---|
| 2,844,056 | 7/1958 | Sladek | 81/9.51 |
| 3,309,948 | 3/1967 | Falken | 81/9.51 |
| 3,527,124 | 9/1970 | Ullman | 81/9.51 |
| 3,857,306 | 12/1974 | Gudmestad | 81/9.51 |
| 3,913,426 | 10/1975 | Blaha | 81/9.51 |

Primary Examiner—James G. Smith
Attorney, Agent, or Firm—James E. Nilles

[57] ABSTRACT

An insulated wire cutting and stripping machine comprising substantially identical upper and lower tool holders and permitting rapid replacement of blades and rapid changes of distance between blades on each holder for stripping off different lengths of insulation from wire ends. The upper and lower tool holders firmly hold the cutting and stripping blades with a clamp and screw. Each blade is on an assembly slideably engaged with an assembly carrying another blade on the same holder and sliding of the assemblies with respect to one another thus changes the distances between these blades.

7 Claims, 9 Drawing Figures

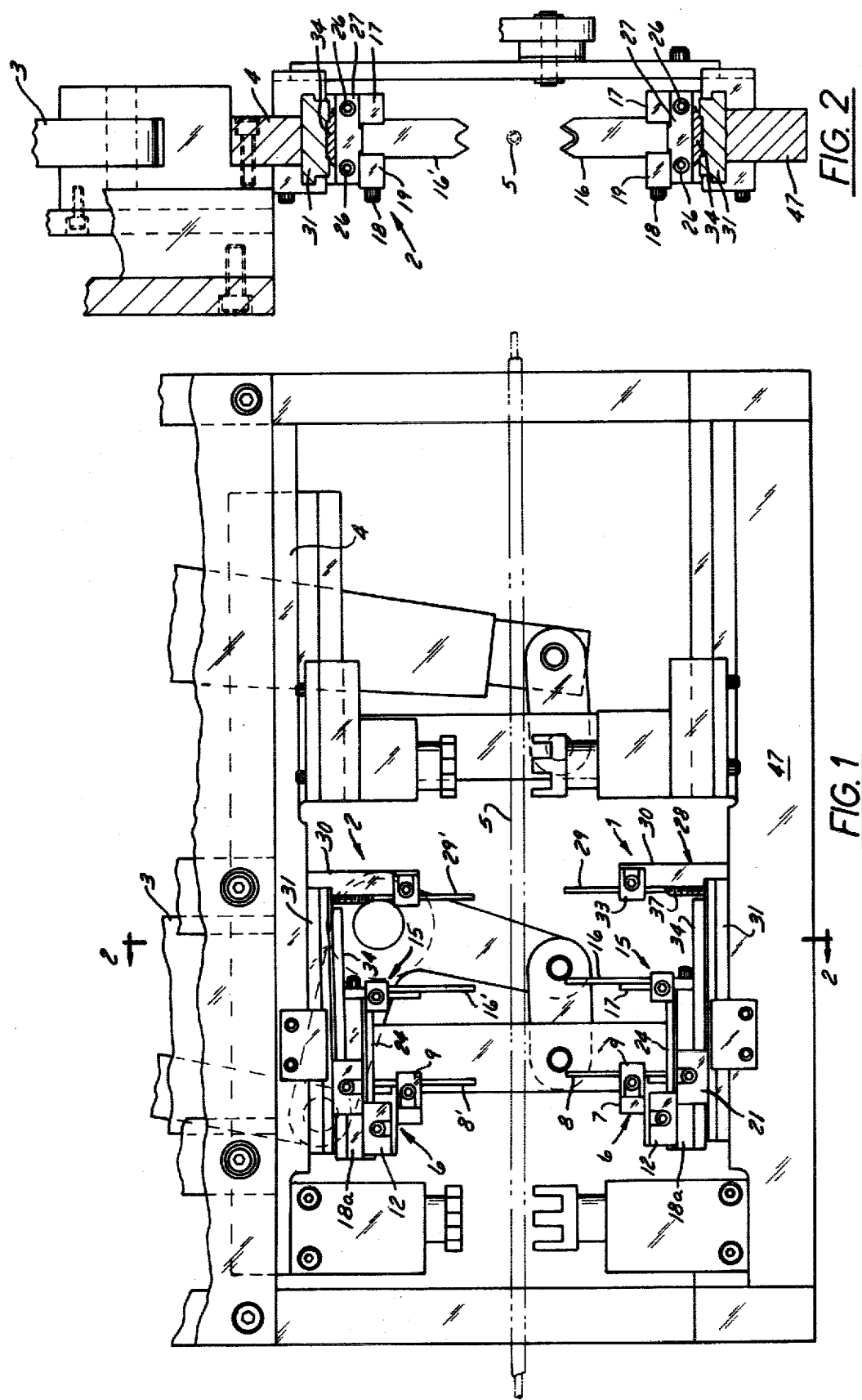

QUICK CHANGE WIRE CUTTING AND STRIPPING BLADE TOOL HOLDER

BACKGROUND OF THE INVENTION

1. Field of Use

This invention relates generally to wire cutting and stripping machines. In particular, it relates to a wire cutting and stripping blade tool holder which permits rapid changes thereon, including rapid changes of blades and distances between blades to effect stripping of various lengths of insulation from wire or cable ends.

2. Description of the Prior Art

Automatic wire cutting and stripping machines are well known and when their blades are properly set up in the machine, provide rapid cutting and stripping of insulated wire of various diameters. However, in prior art machines such as shown in U.S. Pat. No. 3,913,426 issued to Blaha on Oct. 21, 1975, and assigned to the same assignee as the present invention, the tool holders which engage the wire cutting and stripping blades make changes in the blades or the distances therebetween difficult and timeconsuming. In the prior art, the tool holders had to be removed from the machine. Each tool holder generally held three blades, two for stripping the wire ends and one between those two for cutting the wire. To change the length of insulation that the blades could strip from the wire, the blades had to be removed from the tool holder and spacers or shims holding the blades to the tool holder between adjacent blades would have to be repositioned or replaced. Even replacing a blade required loosening the shims while the tool holder was outside of the machine. Upon being loosened, the shims could fall from their tool holder before an operator could replace or reposition the blades, further inconveniencing and delaying him, and causing yet more downtime on the cutting and stripping machine.

SUMMARY OF THE INVENTION

An insulated wire cutting and stripping machine is provided with upper and lower tool holders, vertically movable with respect to each other by means therefor. An insulated wire passes along a path between the two tool holders, and each tool holder includes a slide assembly, a slide bar assembly, and a base plate assembly. Each of the two slide assemblies includes a first stripping blade releasably attached to the slide assembly, and each of the base plate assemblies includes a second stripping blade releasably attached to the base plate assembly. Each of the slide bar assemblies includes a cutoff blade which is releasably attached to the slide bar assembly, and which is further located between the first and second stripping blades. Each of the slide assemblies is slideably mounted on its respective slide bar assembly for movement therealong whereby each of the first stripping blades may be moved along the wire's path toward and away from the cut-off blade on the same tool holder. Each of the slide bar assemblies is slideably mounted on its respective base plate assembly for movement therealong, whereby each of the cut-off blades may be moved along the wire's path toward and away from the second stripping blade on the same tool holder. Means are further provided for effecting vertical relative movement between the stripping blades.

The insulated wire cutting and stripping machine described herein offers several advantages over prior art machines. The tool holders need not be removed from the machine to replace or adjust distances between the blades. The tool holders in the machine and the means for adjusting the positions of or replacing the blades are readily accessible. A few turns of a screw engaging a clamp release a blade from its assembly and enable its quick replacement. A few turns of a screw engaging another clamp permits the assemblies to be slideably moved with respect to one another, whereby the blades are moved along the wire's path to effect cutting of various lengths of insulation from a wire. All of these advantages result in less time for an operator to change or reposition blades and less downtime of the wire cutting and stripping machine during such changes, resulting in a smaller cost of operation for the machine.

Other objects and advantages of the present invention will appear hereinafter as this disclosure progresses, reference being had to the accompanying drawings.

BRIEF DESCRIPTION OF THE DRAWINGS

FIG. 1 is an elevational front view of a part of a wire cutting and stripping machine embodying the present invention;

FIG. 2 is a sectional view taken along the line 2—2 in FIG. 1;

DESCRIPTION OF A PREFERRED EMBODIMENT

Figure 3:
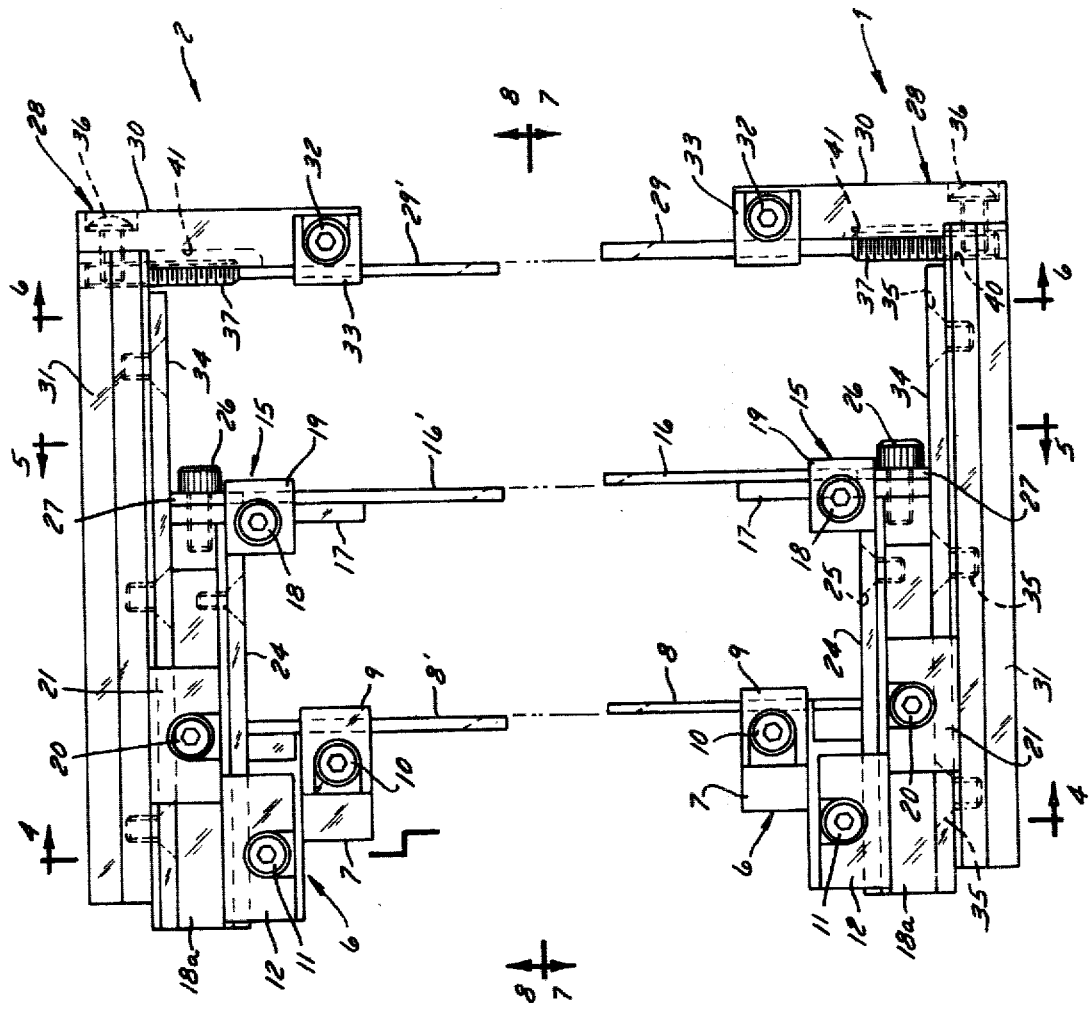
FIG. 3 is an enlarged view of part of the machine shown in FIG. 1, showing the upper and lower tool holders thereof.
Figure 4:
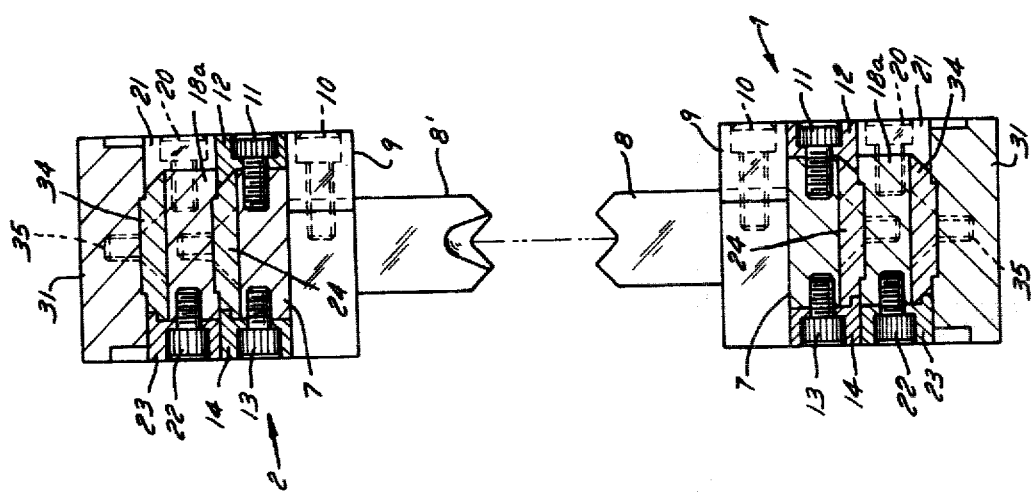
FIG. 4 is a sectional view taken along the line 4—4 of FIG. 3.
Figure 8:
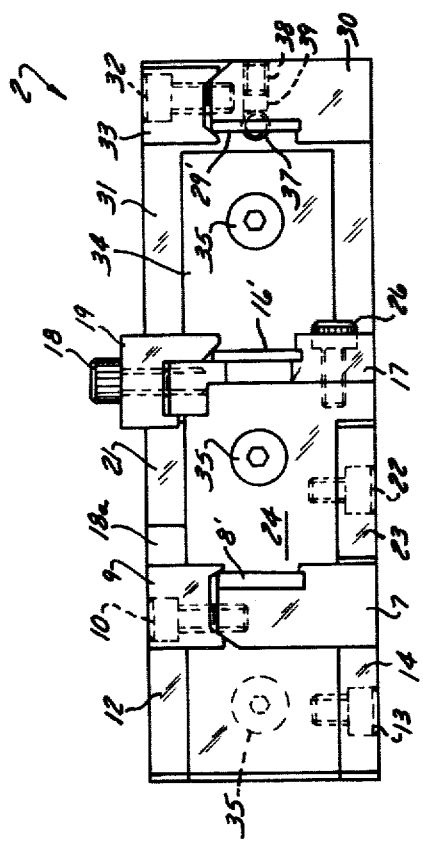
FIG. 8 is a sectional view taken along the line 8—8 of FIG. 3.
Figure 7:
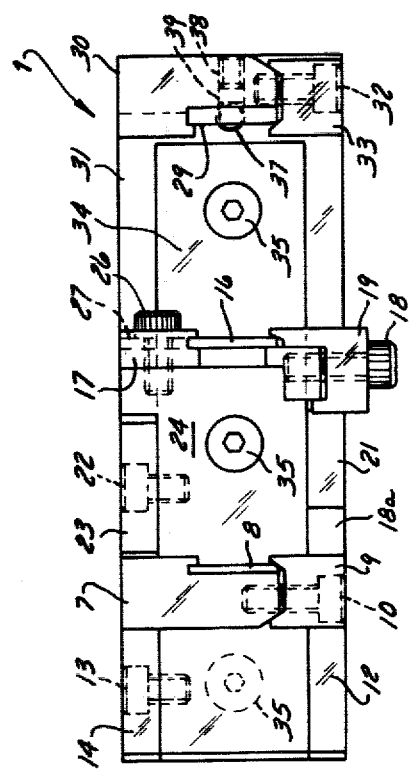
FIG. 7 is a sectional view taken along the line 7—7 of FIG. 3.
Figure 5:
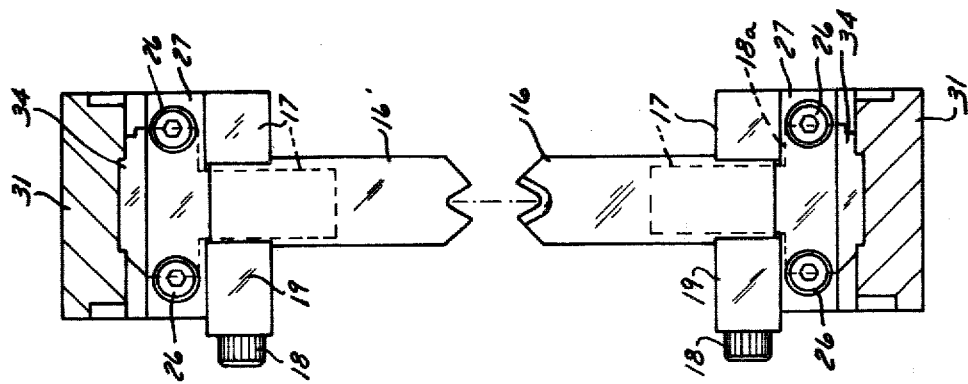
FIG. 5 is a sectional view taken along the line 5—5 of FIG. 3.
Figure 6:
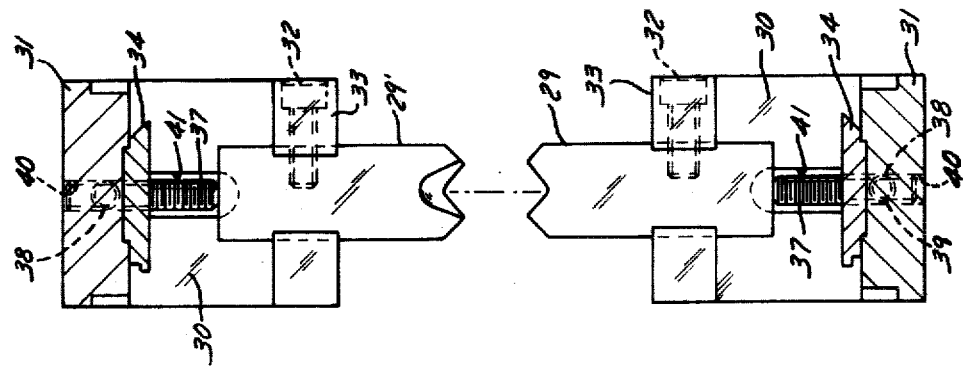
FIG. 6 is a sectional view taken along the line 6—6 of FIG. 3.
Figure 9:
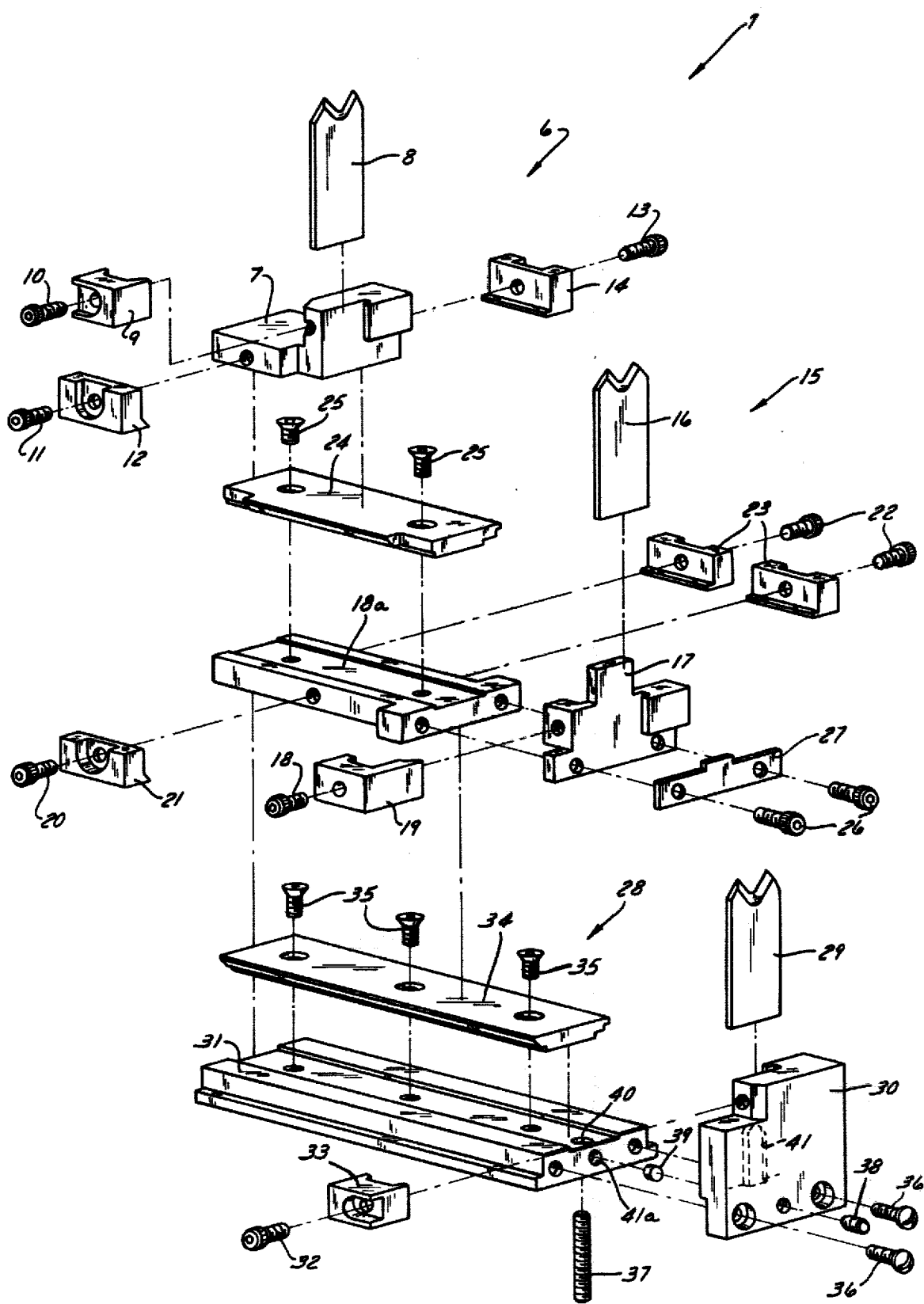
FIG. 9 is an exploded perspective view of the lower tool holder of FIG. 3.

The tool holders described herein may be utilized on many wire cutting and stripping machines. This embodiment will describe the use of such tool holders on a machine as described and shown in U.S. Pat. No. 3,913,426 issued to Blaha on Oct. 21, 1975. Most of the major components described therein, including the wire feeding device, the wire stock clamping means, the cut wire gripping means, the cam actuated linkage mechanisms, and the cut wire discharge mechanism are included in this embodiment. The cutting blade assemblies of Blaha (U.S. Pat. No. 426) are replaced in this embodiment by the lower and upper tool holders 1 and 2 (FIG. 1). Means for causing vertical relative movement between the upper and lower tool holders for cooperative cutting and stripping of insulated wire 5 are included, and such vertical relative movement is caused by the downward pushing of a rocker arm assembly (not shown) upon vertical slide block 3, which is secured to the upper tool supporting rail 4, and to which upper tool holder 2 is fixedly engaged. Thus, downward pushing of the rocker arm assembly causes downward movement of the vertical slide block 3, the upper tool supporting rail 4, and the upper tool holder 2. Similarly, lower tool holder 1 is fixedly engaged to lower tool supporting rail 47.

Because the lower and upper tool holders 1 and 2 are similar in components and operation, only the construction of one of the holders need be recited. As may be seen in FIG. 1, the upper tool holder 2 is a mirror image of the lower tool holder 1. The upper tool holder 2 will be identified with the same numbers as lower tool holder 1.

SLIDE ASSEMBLY

The slide assembly 6 is one of three assemblies comprising the lower tool holder 1, and includes slide 7, first stripping blade 8 detachably mounted in a vertical slot in slide 7, and slide clamp screw 10 threadably engaged with slide 7 on its front-facing side and passing through slide blade clamp 9 to hold that clamp abuttingly against the first stripping blade 8. In this way, the clamp 9 and screw 10 wedgingly engage the first stripping blade 8 in the vertical slot of slide 7 of slide assembly 6.

A slide fixing screw 11 is also threadably engaged to slide 7 on its front-facing side, and passes through a slide fixing clamp 12 effecting movement of that clamp 12 transversely of the wire's path. The slide fixing clamp 12 engages both the slide assembly 6 and the slide bar assembly 15, to be described hereinbelow, and depending on the tightness of slide fixing screw 11, permit or prevent these slideably movable assemblies to slide relative to each other.

A slide guide screw 13 is threadably engaged to the rear-facing side of slide 7, and passes through a stationary slide guide 14 to fix the slide guide 14 to the slide 7. The slide guide 14 directs movement of the slide assembly 6 on the slide bar assembly 15 as will be explained hereinbelow.

SLIDE BAR ASSEMBLY

The slide bar assembly 15 includes a cut-off blade 16 detachably mounted in a vertical slot in cut-off blade holder 17. Slide bar clamp screw 18 is threadably engaged to cut-off blade holder 17 on the front-facing side of cut-off blade 16 and passes through a slide bar blade clamp 19 to hold that clamp abuttingly against the cut-off blade 16. In this way, the clamp 19 and screw 18 wedgingly engage the cut-off blade 16 in the cut-off blade holder 17.

A slide bar fixing screw 20 is also threadably engaged to slide bar 18a on the slide bar's front-facing side, and passes through a slide bar fixing clamp 21 effecting movement of that clamp 21 transversely of the wire's path. The slide bar fixing clamp 21 engaged both the slide bar assembly 15 and the base plate assembly 28, to be described hereinbelow, and depending on the tightness of slide bar fixing screw 20, permit or prevent the slideably movable slide bar assembly 15 to slide relative to the base plate assembly 28, which base plate assembly 28 is fixed with respect to the cutting and stripping machine.

A pair of slide bar guide screws 22 are threadably engaged to the rear-facing side of slide bar 18a and pass through a pair of slide bar guides 23 to fix the slide bar guides 23 to the slide bar 18a. The slide bar guides 23 direct movement of the slide bar assembly 15 on the base plate assembly 28 as will be explained hereinbelow.

A slide bar gib 24 is fixedly attached to a slot in the top of slide bar 18a with a pair of slide bar gib screws 25. A plate 27 and the cut-off blade holder 17 are fixedly attached to the right slide of slide bar 18a by a pair of plate fixing screws 26. Plate 27 in this embodiment has an inverted T-shape and the inverted base of the plate 27 serves as a lower limit of travel of cut-off blade 16 within the slot of cut-off blade holder 17.

BASE PLATE ASSEMBLY

The base plate assembly 28 includes a second stripping blade 29 detachably mounted in a vertical slot in end plate 30. Base plate clamping screw 32 is threadably engaged to end plate 30 on the end plate's front-facing side and passes through a base plate blade clamp 33 to hold that clamp abuttingly against the second stripping blade 29. In this way, the clamp 33 and screw 32 wedgingly engage the stripping blade 29 in the end plate 30.

A base plate gib 34 is fixedly attached to a slot in the top of base plate 31 with three base plate gib screws 35. End plate 30 is fixedly attached to the right side of base plate 31 with a pair of end plate screws 36. In this fixed position, a portion of end plate 30 overlaps part of the top of base plate 31, and these overlapping portions contain a threaded base plate bore 40 and an end plate clearance slot 41 whose axes are coincident so as to permit threadable engagement of a set screw 37 therein. The set screw 37 is vertically positionable in bore 40 and extends into slot 41 and its top serves as a lower limit of travel of stripping blade 29 within the slot of end plate 30. Rotation of set screw 37 within bore 40 and slot 41 during use of the lower tool holder 1 in wire cutting and stripping operations would be undesirable, as this would lower or raise the stripping blade 29 within the end plate 30 and thereby change the lower limits of its travel, resulting in a different depth of cut from the wire's insulation. To prevent such rotation, a locking set screw 38, whose axis is normal to that of set screw 37, is threadably engaged in the side of end plate 30 and engages brass plug 39, within a plug bore 41a in the right side of base plate 31, to lock against the threaded portion of set screw 37.

CHANGING LENGTH OF INSULATION STRIPPED FROM WIRE ENDS

When the lower and upper tool holders 1 and 2 are moved vertically with respect to one another by means therefor, the stripping and cutting blades on the tools come together to cut the wire and to strip a length of insulation from the ends of the two wires adjacent the cut. For example, in FIG. 3, vertical relative movement of upper tool holder 2 against lower tool holder 1 results in a gripping of wire 5 in place between the tool holders (FIG. 1) and its cutting by cut-off blades 16 and 16'. Stripping blades 29 and 29' cut into the insulation of the cut wire to the right of cut-off blades 16' and 16, so as to remove that portion of insulation from that wire end, and the length of insulation removed is equal to the distance between blades 16 and 29, which distance is equal to that between blades 16' and 29'. Similarly, stripping blades 8 and 8' cut into the insulation of the cut wire to the left of cut-off blades 16' and 16, so as to remove that portion of insulation from that wire end, and the length of insulation removed is equal to the distance between blades 8 and 16, which distance is equal to that between blades 8' and 16'. The lengths of insulation which may be cut from the wire ends may thus be changed by changing the distances between the blades. This distance may be changed by moving the sliding assemblies horizontally relative to one another.

For example, to decrease the length of insulation stripped from the wire to the left of cut-off blades 16 and 16', stripping blade 8 is moved closer to cut-off blade 16 and stripping blade 8' is moved an equal distance towards cut-off blade 16'. On lower tool holder 1, this movement is quickly accomplished by merely loosening slide fixing screw 11. Slide fixing clamp 12 now loosely engages slide assembly 6 at slide 7 and slide bar assembly 15 at slide bar gib 24 and permits relative sliding movement of slide 7 on slide bar gib 24, which movement is guided by stationary slide guide 14. When first stripping blade 8 and cut-off blade 16 are spaced apart to effect the cut of the desired length of insulation, slide fixing screw 11 is retightened so as to prevent further relative sliding motion between slide assembly 6 and slide bar assembly 15. The distance between stripping blade 8' and cut-off blade 16' of upper tool holder 2 is changed in like manner.

Similarly, the length of insulation removed from the wire to the right of cut-off blades 16' and 16 may be varied. Slide bar fixing screw 20 is loosened, permitting relative motion of slide bar 18a on base plate gib 34 guided by slide bar guides 23 so that there is movement of cut-off blade 16 and of stripping blade 8, which is fixed relative to blade 16 by the clamping of slide assembly 6 to slide bar assembly 15, towards and away from stripping blade 29. When the slide bar assembly 15 has been moved sufficiently on base plate gib 34 to effect proper distance between cut-off blade 16 and stripping blade 29 for stripping of the desired length of insulation, slide bar fixing screw 20 is retightened. Relative movement of cut-off blade 16' and stripping blade 29' of upper tool holder 2 is effected in like manner.

REPLACEMENT OF BLADES

Blades are readily replaced in the lower and upper tool holders 1 and 2. For example, first stripping blade 8 is replaced by loosening slide clamp screw 10, which causes the loosening of slide blade clamp 9 on slide 7 so that first stripping blade 8 is no longer tightly engaged therebetween. The operator need now merely lift the blade 8 out from the slot in slide 7, replace it with a new blade, and retighten the slide blade clamp 9 with the slide clamp screw 10 to wedgingly engage the new blade 8 against the slide 7 of the slide assembly 6.

Similarly, cut-off blade 16 may be removed by loosening slide bar clamp screw 18, and stripping blade 29 may be removed by loosening base plate clamping screw 32.

RECAPITULATION

The wire cutting and stripping machine provides for rapid changing of cutting and stripping blades and of distances therebetween. The tool holder containing the blades need not be removed from the machine to effect such changes. There are no shims positioning the blades in their tool holders, and thus no need for time-consuming shifting thereof to effect a different spacing between blades. All blade changes can be made by little more than simply turning a few screws. These substantial improvements result in lower costs of operation for wire cutting and stripping machines by lowering operator time needed for changes and by lowering machine downtime.

I claim:

1. In an insulated wire cutting and stripping machine, upper and lower tool holders vertically movable with respect to each other for the passage of an insulated wire along a path therebetween, each tool holder having (1) a slide assembly, (2) a slide bar assembly, and (3) a base plate assembly; each of said slide assemblies including a first stripping blade releasably attached thereto, said base plate assemblies each including a second stripping blade releasably attached thereto, and said slide bar assemblies each including a cut-off blade releasably attached thereto and located between said first and second stripping blades, each of said slide assemblies being slideably mounted on its respective slide bar assembly for movement therealong whereby each of said first stripping blades may be moved along said path toward and away from its respective cut-off blade, and each of said slide bar assemblies being slideably mounted on its respective base plate assembly for movement therealong whereby each of said cutoff blades may be moved along said path toward and away from its second stripping blade; means for causing vertical relative movement between said upper and lower tool holders for cooperative cutting and stripping of said insulated wire passing therebetween.

2. The machine of claim 1 including means for releasably attaching each of said blades, wherein each of said means comprises clamp and screw means to wedgingly engage each of said blades against its assembly.

3. The machine of claim 2 wherein said clamp and screw means comprises a clamp abuttingly against its respective blade and held thereto by a screw passing through said clamp and threadably engaged in its respective assembly.

4. The machine of claim 1 including means for fixing the relative positions of said slideably mounted assemblies with respect to each other, wherein each of said means comprises fixing clamp and screw means.

5. The machine of claim 3 including means for fixing the relative positions of said slideably mounted assemblies with respect to each other, wherein each of said means comprises fixing clamp and screw means.

6. The machine of claim 4 wherein said fixing clamp and screw means comprises a fixing clamp releasably engaging both of said relatively slideably movable assemblies to prevent their relative slideable movement, and which further comprises a fixing screw threadably engaged to one of said relatively slideably movable assemblies and which passes through said clamp and effects movement thereof transversely of said path whereby said clamp releasably engages said relatively slideably movable assemblies.

7. The machine of claim 5 wherein said fixing clamp and screw means comprises a fixing clamp releasably engaging both of said relatively slideably movable assemblies to prevent their relative slideable movement, and which further comprises a fixing screw threadably engaged to one of said relatively slideably movable assemblies and which passes through said clamp and effects movement thereof transversely of said path whereby said clamp releasably engages said relatively slideably movable assemblies.

* * * * *